Nov. 6, 1945.    F. M. CLARK    2,388,524
APPARATUS FOR ABSORBING DECOMPOSITION PRODUCTS
Filed June 12, 1943
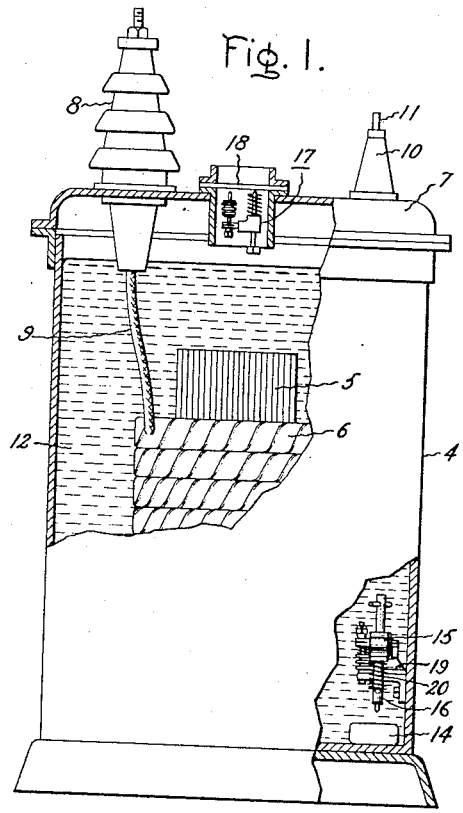
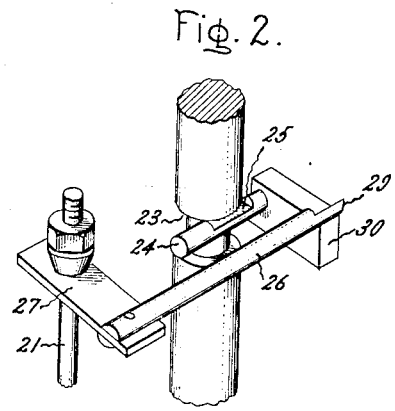
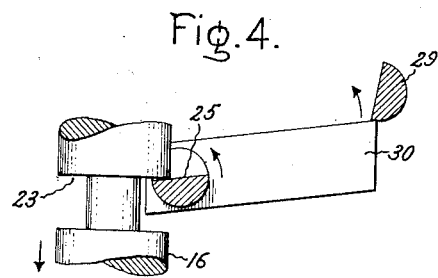
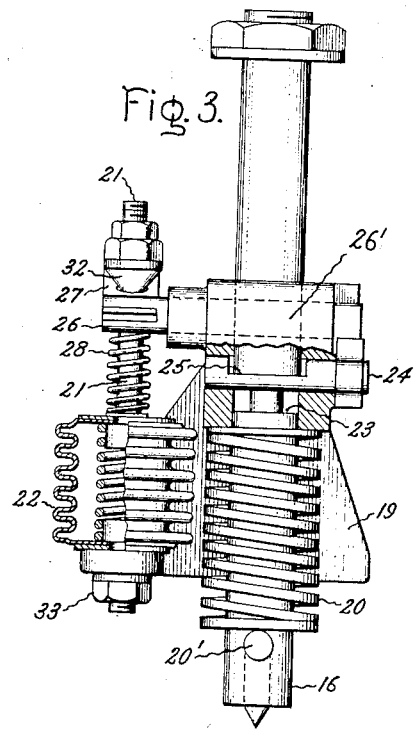
Inventor:
Frank M. Clark,
by Harry E. Dunham
His Attorney.

Patented Nov. 6, 1945

2,388,524

UNITED STATES PATENT OFFICE 2,388,524

APPARATUS FOR ABSORBING DECOMPOSITION PRODUCTS

Frank M. Clark, Pittsfield, Mass., assignor to General Electric Company, a corporation of New York Application June 12, 1943, Serial No. 490,622

4 Claims. (Cl. 175—361)

The present invention relates to electric apparatus which operates in the presence of a body of liquid halogenated hydrocarbons. It is the object of my invention to protect such apparatus against injury by corrosive decomposition products.

Electric transformers which are provided with a liquid-cooling medium consisting of one or more chlorinated products may operate for many years without the occurrence of the slightest decomposition of the cooling medium. If, however, due to lightning or other disturbance in the abnormal electric distribution, an electric discharge should occur between parts of the transformer and come in contact with the chlorinated medium, decomposition is likely to occur, resulting in the evolution of hydrogen chloride.

A small amount of hydrogen chloride or other halogen decomposition product can be rendered innocuous by a fixative compound which may be added to the main body of the chlorinated cooling and insulating liquid. Various fixatives are disclosed in my prior Patents 2,105,406 and 2,105,407 which are suitable for addition to chlorinated dielectric liquid. Such fixatives include nitriles, such as benzyl cyanide, also terpenes, camphors and ethereal oils.

In some cases, however, if the evolution of hydrogen halide is excessive, such means is not adequate to protect the electric apparatus. It is impracticable to associate a halogenated dielectric with large amounts of an absorber or fixative. The dielectric properties of the most efficient fixatives commonly are inferior to the dielectric properties of the halogenated material. The fixative may have various objectionable properties as, for example, inflammability or high dielectric loss or low dielectric strength.

In accordance with my present invention these objections have been overcome. I have provided in electric apparatus which contains a halogenated product subject to decomposition also a segregated quantity of a fixative agent in combination with trigger-operated automatic means for bringing the fixative agent into contact with the liquid halogenated product upon the occurrence of active chemical decomposition.

One form of apparatus for carrying out my invention is shown in the accompanying drawing in which Fig. 1 is a side elevation partly in section of a transformer which is provided with means for introducing a fixative upon accumulation of predetermined amount of gaseous pressure in the sealed housing enclosing the transformer; Fig. 2 is a perspective view of a portion of the mechanism for rupturing a container filled with fixative; Fig. 3 is a side view of the container-rupturing mechanism; and Fig. 4 is a somewhat diagrammatic detail view of parts shown in Fig. 2 as seen from another angle.

The electrical apparatus shown in Fig. 1 comprises a sealed tank 4, shown in part broken away, containing a transformer consisting of a magnetic core 5 and electric windings 6. As such a device is well known, it has been merely indicated and will not be described in detail. It will be referred to in general terms as an energy-translating device. The cover 7 is provided as usual with insulated electric bushings. The drawing shows a high potential bushing 8 for the conductor 9 and a low potential bushing 10 for the conductor 11, others being omitted for the sake of simplifying the drawing. The energy-translating device is enveloped by a body 12 of cooling and insulating liquid which may consist of halogenated hydrocarbon, or a mixture of such hydrocarbons as described, for example, in my prior Patent 1,931,455, patented October 17, 1933. The liquid 12 may consist, for example, of a mixture of trichlorbenzene and hexachlor diphenyl.

Ordinarily, chlorine is the halogen most commonly present in such compounds and, for this reason, such products will be hereinafter termed chlorinated products.

The liquid chlorinated products may be blended with about 1 to 10 per cent by weight with a suitable fixative such as described in my prior Patents 2,105,406 and 2,105,407, or with a fixative consisting of a heterocyclic ring compound such for example as quinaldine. The presence of such fixative associated with or dissolved in the chlorinated products is not necessary in all cases.

At or near the bottom of the tank 4 is located a receptacle 14 which may be made of glass, and contains an additional quantity of fixative material capable of combining with hydrogen chloride or equivalent hydrogen halide. This fixative may consist of aniline, quinaldine, or other material capable of combining with decomposition products. In some cases the fixative in the receptacle 14 may consist of an aqueous solution of sodium hydroxide or other strong base.

An automatic device 15 including a spring-operated plunger is located above the receptacle 14. In case sufficiently persistent arcing should occur to cause the amount of hydrogen chloride to exceed the combining capability of the reagent dissolved in the chlorinated dielectric body which, as above stated, normally should not exceed 10%, then the accumulation of gaseous pressure in the tank 4 will cause the tripping of the device 15 which will cause the plunger 16 to strike and break the receptacle 14. The contents of this receptacle then will escape and rapidly diffuse in the body 12 of contaminated dielectric liquid where the fixative will render innocuous the free hydrogen chloride, thus preventing dangerous rise of pressure which might rupture the enclosing tank and the discharge of obnoxious gas into the atmosphere.

Should, however, this added amount of fixative discharged from the receptacle 14 be insufficient to halt the accumulation of decomposition products, then a second plunger device 17 which is set to operate at a higher pressure than the device 15 will be tripped, causing breakage of a glass diaphragm 18 held in the cover 7. The release of pressure by the breakage of this diaphragm will insure that in the event of abnormal and excessive gas evolution no dangerous explosion of the transformer tank will occur.

The plunger device 15 is mounted on a support 19 which is attached by bolts or otherwise to the wall of the tank 4. The plunger shaft 16, when set in a retracted position, compresses a spring 20 against a stop 20' and is held, as will be described, in this position until released by the motion of a tripping stem 21 connected to a Sylphon bellows 22. When released, the spring 20 drives the plunger 16 against the receptacle 14 and ruptures it, releasing the contents.

The tripping mechanism is shown in Figs. 2 and 4. The plunger 16 is provided with a cut-out section 23. A transverse rotatable shaft 24, also having a cut-out section 25, may be engaged with the section 23 of the plunger 16 when the spring 20 is compressed. A second shaft 26 is mounted in a bearing 26' and is rotatable through a small arc by a connecting lever 27. The lever 27 is biased by a spring 28 (Fig. 3) against rotation. The shaft 26 engages with a latch 30 (Figs. 2 and 4) which is connected to the shaft 24. Rotation of the shaft 26 through a small angle will cause its cut-away end 29 to free the latch 30, then this may move upwardly as shown in Fig. 4, thereby unlatching the parts 23 and 25, thus permitting the plunger 16 to move downwardly.

When pressure accumulates in the tank due to the evolution of gas, the Sylphon bellows 22 is compressed by the gaseous pressure, causing the stem 21 to move downwardly. The cone-shaped top 32 on the end of the stem 21 engages with the lever 27 causing it to rotate the shaft 26. Initially the spring 20 is compressed, urging the latch 30 against the end 29 of the shaft 26. As the stem 21 moves downwardly and the shaft 26 is rotated, the latch 30 is released (Fig. 4) allowing the spring 20 to drive the plunger 16 to its extended position. The Sylphon bellows may be set by the lock nut 33 to release the latching mechanism at a predetermined pressure, for example, a few pounds.

The mechanism 17 whereby the window 18 is shattered operates in a similar manner. It may be set to release at a higher pressure, say 8 to 10 pounds.

While my invention has been described by reference to a particular embodiment thereof, it will be understood that numerous modifications may be made within the scope thereof, and are intended to be covered by the appended claims as coming within the spirit and scope of my invention.

What I claim as new and desire to secure by Letters Patent of the United States is:

1. An electric transformer comprising a sealed tank, inductively related windings therein, a quantity of liquid halogenated hydrocarbon enveloping said windings, a submerged sealed receptacle in said tank containing a liquid fixative which is capable of combining with gaseous halogen-containing decomposition products, and trigger-controlled means for breaking said receptacle to release the contents of said receptacle responsive to an abnormal pressure in said tank by the disengagement of gaseous decomposition products in said sealed tank.

2. An electric apparatus comprising a sealed tank, electric windings therein, a body of liquid chlorinated hydrocarbon in which said windings are submerged, said hydrocarbon having a preservative associated therewith, a sealed receptacle in said tank containing a fixative for gaseous decomposition products resulting from contact of an electric arc with said hydrocarbon, a spring-operated plunger capable of being set under tension in position to shatter said receptacle when released, and means responsive to predetermined rise of gaseous pressure in said tank for releasing said plunger.

3. An electric apparatus comprising a sealed tank, electric windings therein, a body of liquid chlorinated hydrocarbon in which said windings are submerged, a frangible sealed receptacle in said tank containing a fixative for gaseous decomposition products which may be formed by contact of an electric arc with said hydrocarbon, a spring-operated plunger capable of being set under tension in position to shatter said receptacle when released and means responsive to predetermined rise of gaseous pressure in said tank for releasing said plunger.

4. An electric device comprising a sealed tank, an energy-translating device therein, a quantity of liquid halogenated hydrocarbon also contained in said tank in contact with said device, a frangible receptacle containing a fixative product which is capable of combining with decomposition products of said halogenated hydrocarbon, a mechanically operated plunger whereby said receptacle may be broken and means responsive to predetermined gas accumulation of abnormal pressure in said tank for operating said plunger to rupture said container and release said fixative into contact with said material.

FRANK M. CLARK.